June 15, 1954   J. L. ATWOOD   2,681,130
CONVEYER SYSTEM FOR BAKERIES
Filed Nov. 14, 1950   3 Sheets-Sheet 1

James L. Atwood
INVENTOR.

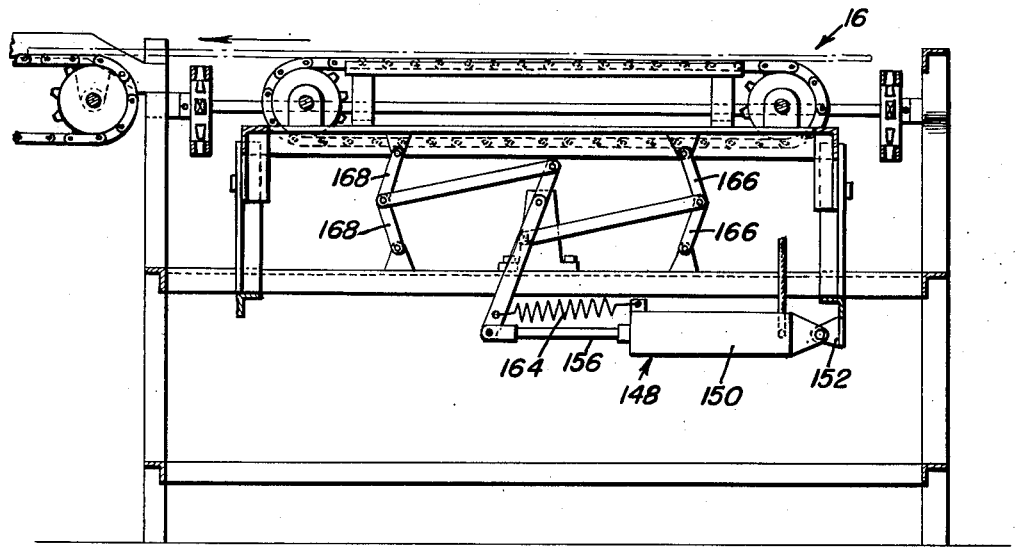
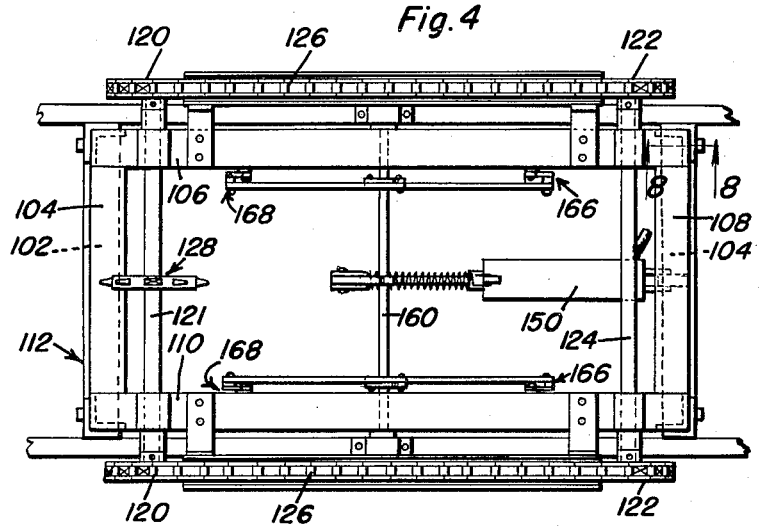

June 15, 1954   J. L. ATWOOD   2,681,130
CONVEYER SYSTEM FOR BAKERIES
Filed Nov. 14, 1950   3 Sheets-Sheet 3
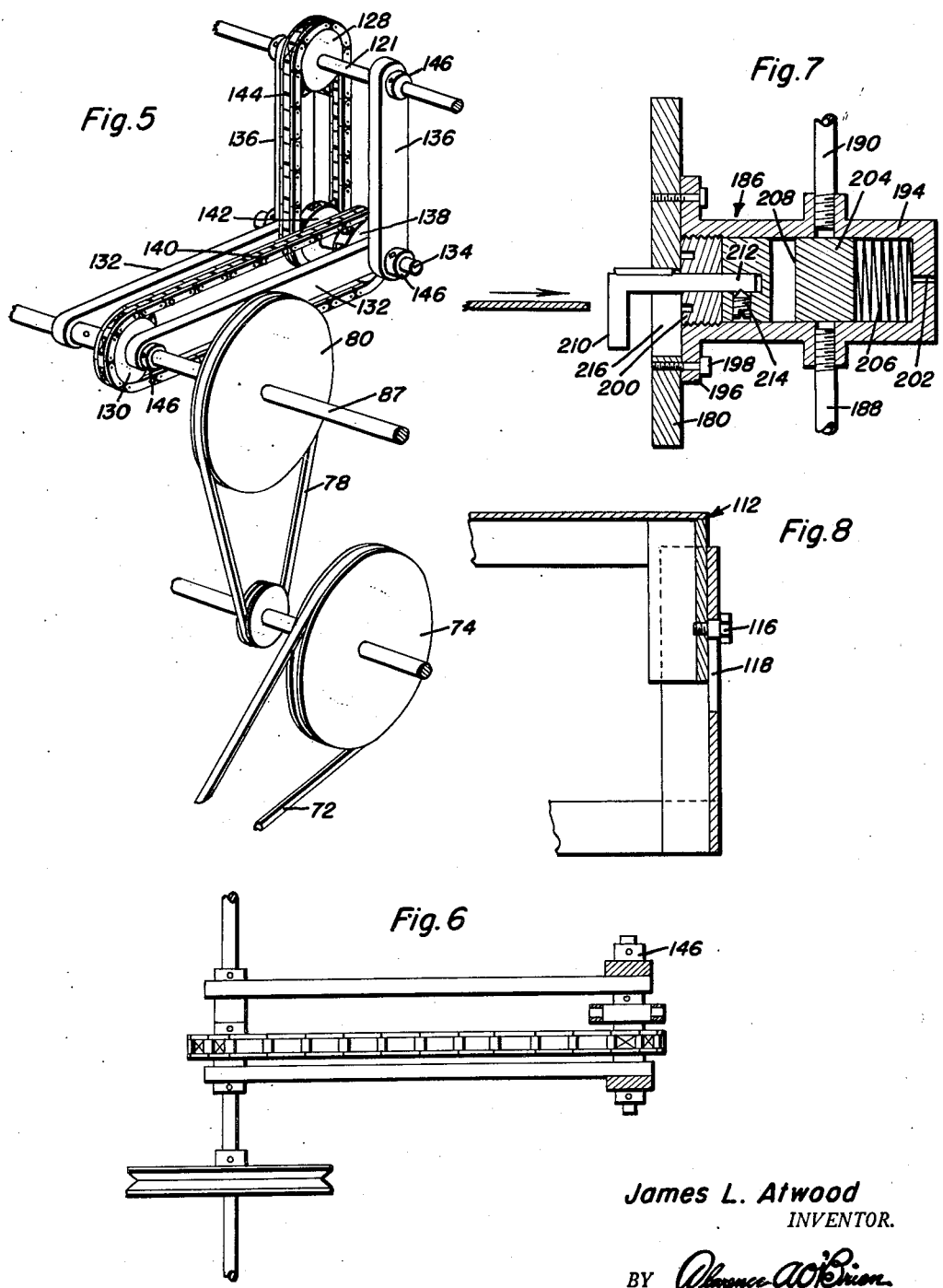
James L. Atwood
INVENTOR.

Patented June 15, 1954

2,681,130

UNITED STATES PATENT OFFICE 2,681,130

CONVEYER SYSTEM FOR BAKERIES

James L. Atwood, Nashville, Tenn.

Application November 14, 1950, Serial No. 195,689

2 Claims. (Cl. 198—21)

The present application is a continuation-in-part of my co-pending application, Serial No. 158,435, now Patent No. 2,639,800, dated May 26, 1953, and relates to improvements in conveyor systems and more particularly to the type of conveyor system which is well adapted for use in bakeries and the like for conveying trays of food articles from one conveyor to another conveyor by a novel transferring means interposed between the conveyors.

An object of the present invention is to provide an improved conveyor system whereby trays of bakery goods may be transferred from one conveyor to another conveyor traveling in a different direction.

A further object of the present invention resides in the novel means whereby the transferring is effected from one conveyor to a second conveyor, the novel means including an intermediate conveyor which is vertically movable on a platform for conveying a tray from the first conveyor to the second conveyor which is angularly disposed thereto.

Another object of the present invention is to provide a means which is actuated in response to movement of the article being conveyed on the first conveyor whereby the article may be transferred to a second conveyor by a transferring means.

Still further objects of the present invention are to provide novel means for vertically moving the platform which comprises an element of the transferring means whereby engagement is had with the article being transferred from the first conveyor to the second conveyor.

This invention also has for its object to provide a common drive means for the first and second conveyors and the intermediate conveyor with pneumatic means being provided for vertically displacing the platform supporting the intermediate conveyor means.

Various other objects and advantages will become apparent from the detailed description to follow. The best form in which I have contemplated applying my invention is clearly illustrated in the accompanying drawings, wherein:

Figure 3 is a vertical longitudinal sectional view taken substantially along the plane of line 3—3 of Figure 1 and showing the transferring means in its raised position;

Figure 4 is a top plan view of Figure 3;

Figure 5 is a detail perspective view showing the connection between the drive means and the intermediate conveyor means;

Figure 6 is a top plan view of a portion of Figure 5;

Figure 7 is a detail sectional view taken substantially along the plane of line 7—7 of Figure 1; and Figure 8 is a detail vertical sectional view taken substantially along the plane of line 8—8 of Figure 4.

Figure 1:
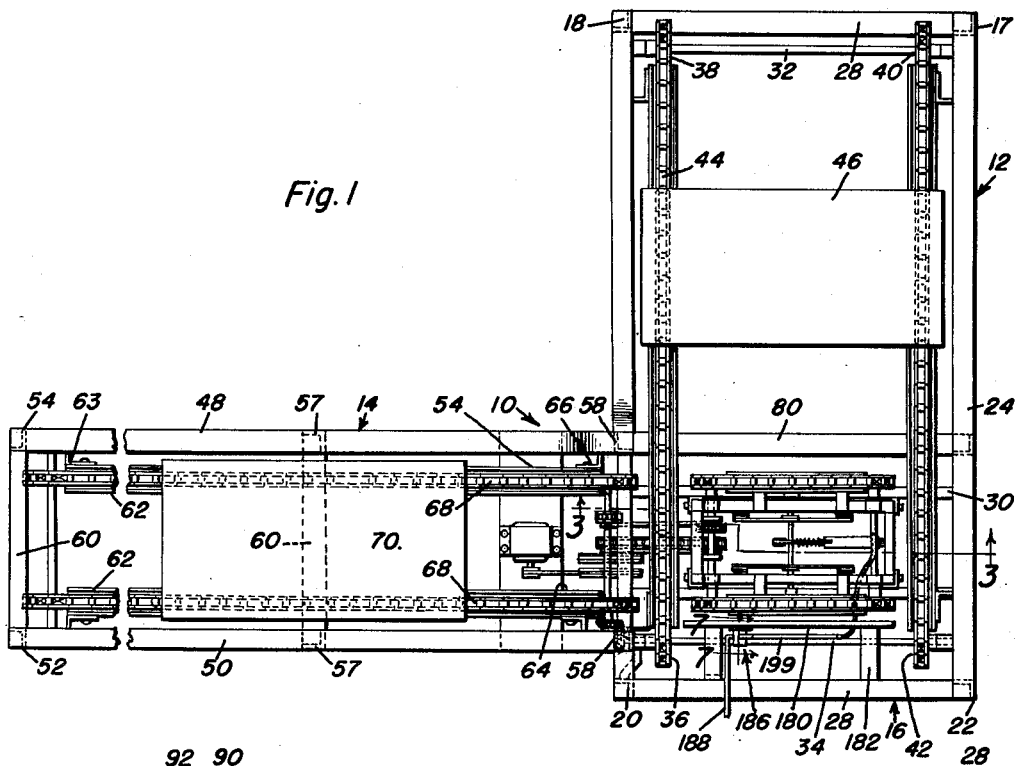
Figure 1 is a top plan view of the conveyor system.

Referring more particularly to the drawings, wherein like numerals designate like parts throughout, the numeral 10 designates generally the conveyor system of the present invention which is comprised of a first conveyor 12 which has its free end juxtaposed to an oven or the like for receiving the articles to be conveyed, a second conveyor 14 to which the articles are to be transferred, and an intermediate conveyor means 16 by which the transfer from the first conveyor 12 to the second conveyor 14 is accomplished.

The frame for the first conveyor 12 is comprised of a plurality of upstanding angle irons 17, 18, 20 and 22 which are longitudinally joined by a plurality of angle irons 24 and 26, transversely extending angle irons 28 joining the ends of the frame to provide a rigid structure. The frame also includes a pair of intermediate struts 30 which join the longitudinal struts 24 and 26.

A pair of transversely extending shafts 32 and 34 are rotatably supported by the frame for the first conveyor 12, and sprockets 36, 38, 40 and 42 are secured to the shafts 32 and 34 for rotation therewith. Conveyor chains 44 are disposed over the sprockets for simultaneous rotation and are adapted to support trays 46 for longitudinal movement from one end of the frame to the transferring means of the intermediate conveyor 16.

The second conveyor 14 is substantially similar in construction to the first conveyor 12, being comprised of a plurality of longitudinally extending angle irons 48 and 50 joining the upstanding angle irons 52, 54, 56 and 58. Transversely extending angle irons 60 join the longitudinally extending angle irons 48 and 50 and the upstanding angle irons 52 and 54, 57 and 56 and 58. A pair of sprockets 62 are rotatably supported on brackets 63 which are secured to the frame for the second conveyor 14. A second pair of sprockets 64 are rotatably secured to brackets 66 which are mounted on the frame for the second conveyor 14 adjacent to the transferring means of the intermediate conveyor 16. A pair of endless conveyor chains 68 are disposed over the sprockets 62 and 64 whereby a tray 70 may be supported for longitudinal movement thereon and from the transferring means of the intermediate conveyor 16.

Figure 2:
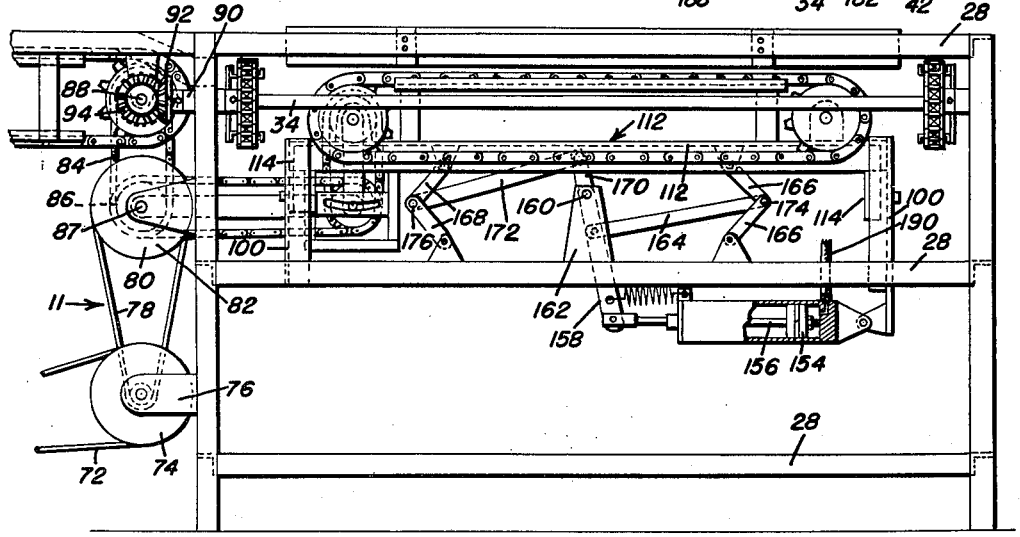
Figure 2 is an end elevational view of the present invention showing the transferring means in its lower position.

The drive means designated generally by the numeral 11 for driving the first and second conveyors 12 and 14 is seen best in Figure 2 as comprising a drive belt 72 for driving a drive pulley 74. The drive pulley 74 is rotatably supported on the outstanding elements 76 which are secured to the frame of the first conveyor 12. An intermediate pulley 80 is similarly rotatably supported by the frame of the first conveyor 12 on the elements 82 and a belt 78 connects the drive pulley 74 with the intermediate pulley 80. Another belt 84 passes over a second sheave of the intermediate pulley 80 and connects the pulley on the shaft 88 for rotation therewith. Since the pulleys 64 are secured to the shaft 88 for rotation therewith, the conveyor chains 68 on the second conveyor 14 will be actuated therewith.

The shaft 34 of the first conveyor 12 has an outwardly extending portion 90 to the end of which is secured a beveled gear 92. The beveled gear 92 is in operative engagement with the beveled gear 94 secured to the shaft 88 of the second conveyor 14, whereby rotation of the drive means effects rotation of both the sprockets 84 of the second conveyor and the sprockets 36 and 42 of the first conveyor 12.

The transferring means whereby the trays may be transferred from the first conveyor 12 to the second conveyor 14 will now be described. Looking now at Figures 2, 3 and 4, it will be seen that four upstanding angle irons 100 are secured in spaced relation to each other having their bases secured to transversely extending angle irons 28 and 30 of the frame of the first conveyor 12. A pair of angle irons 102 and 104 join the bases of the upstanding angle irons 100. Disposed over the upper ends of the upstanding angle irons 100 is a substantially rectangular frame comprised of the angle irons 104, 106 108 and 110 which have their ends secured to each other to provide a substantially rectangular frame. The corners of the rectangular frame which comprise the platform 112 have downwardly extending angle irons 114 which are reciprocably guided within the upstanding angle irons 100, as seen best in Figure 8. A plurality of set screws 116 are secured to the downwardly extending angle irons 114 for vertical reciprocation in the slots 118 formed in the upwardly extending angle irons 100, whereby the vertical displacement of the platform 112 may be limited.

A pair of sprocket gears 120 are secured to the ends of the shaft 121 which is rotatably supported on the platform 112 for vertical displacement therewith. A second pair of sprocket gears 122 are secured to the shaft 124 for rotation therewith, the shaft 124 being similarly disposed on the platform 112 for movement therewith. Endless chain means 126 are disposed over the pairs of sprocket gears 120 and 122 for rotation therewith.

The means for effecting actuation of the sprockets 120 and shaft 121 to which they are attached, includes the sprocket 128 which is secured to the shaft 121. As seen best in Figure 5, a sprocket 130 is secured to the shaft 87 of the intermediate pulley 80 for rotation therewith. A pair of spacer bars 132 are rotatably disposed on the shaft 87 on either side of the sprocket gear 130 and support a shaft 134 by their outer ends. A second pair of spacer bars 136 have their ends rotatably mounted on the shaft 134 and the shaft 121 and are disposed on either side of the sprocket 128. An intermediate sprocket 138 is secured to the shaft 134 and is connected to the sprocket 130 by means of the chain 140. A second intermediate sprocket 142 is secured to the shaft 134 for rotation therewith and is connected to the pulley 128 by means of the chain 144 whereby rotation of the shaft 87 is accompanied by rotation of the shaft 121. It will readily be seen that relative movement between the shafts 121 and 87 will always be accompanied by simultaneous rotation when the drive means is actuated, since the sprockets will be maintained in operative relation to the chains by the spacer bars 132 and 136. Thus, the first conveyor 12, second conveyor 14 and intermediate conveyor chains 126 will all be simultaneously operated by the common drive means 11.

Of course, stop collars 146 are provided on the shafts 87, 134 and 121 for maintaining the spacer bars 132 and 136 in their desired relation.

The actuating means 148 is comprised of a cylinder 150 which is pivotally secured to a bracket 152 at one end, which is in turn secured to the frame for fixed positioning. A piston 154 and plunger 156 are reciprocably mounted in the cylinder 150 and the outer end of the plunger 156 is connected to a lever 158 which is pivotally mounted on the pin 160, the pin 160 being rotatably supported by the upstanding bracket 162 secured on the frame. A tension spring 164 connects the lever 158 to the cylinder 150 for normally maintaining the lever 158 in a first position.

A pair of levers 166 are pivotally connected together and to brackets on the frame and on the platform 112. A second pair of levers 168 are pivotally connected together and to the platform 112 and frame of the first conveyor. Intermediate levers 170 are secured for rotation with the pin 160 and have their ends connected by connecting levers 172 to the pivot points between the pairs of levers 166 and 168, and 174 and 176.

As seen best in Figure 4, the pairs of levers 166 and 168 have their upper ends connected to the angle iron elements 106 and 110. It will therefore be seen that when the plunger 156 of the fluid actuating means 148 is moved from the position shown in Figure 2 to the position shown in Figure 3, the levers will effect vertical movement of the platform 112 with respect to the frame of the first conveyor, thereby raising the intermediate conveyor so that the upper surface thereof is in the same level as the tray 46 on the first conveyor.

Looking once again at Figure 1, it will be seen that a plate 180 is disposed in spaced relation to the end of the frame of the first conveyor 12 by means of the bars 182 and 184. A valve 186 is secured to the plate 180 and has an inlet conduit 188 and outlet conduit 190 connected thereto. The outlet conduit 190 connects the valve 186 with the cylinder 150.

The valve 186 is best shown in Figure 7 as comprising a valve housing 194 which is substantially cylindrical in cross section, having an end flange 196 for securing to the wall 180 by means of the screws 198. One end of the housing 194 is closed by the threaded closure 200 while the other end is provided with a bleeder hole 202. A piston valve 204 is reciprocably mounted within the housing 194 and a spring 206 normally urges the valve 204 to a closed position. The piston valve 204 is provided with a transversely extending bore 208 which is adapted to be placed either out of communication with the conduits 188 and 190 or in communication with the conduits 188 and 190 when a tray strikes the valve operator 210. The valve operator 210 is comprised of an angulated rod which has one end received in a recess 212 and one end of the piston valve 204 with a set screw 214 adapted to adjustably secure the valve operator 210 therein. The valve operator 210 extends through a slot 216 in the plate 180 and is always positioned for engagement by a longitudinally moving tray 46 on the first conveyor 12, when it reaches its endmost position.

From the foregoing description, taken in conjunction with the drawings, it is believed that a device has been provided which will accomplish all of the objects hereinabove set forth and that the operation thereof will be readily obvious to one skilled in the art. When the conveyor system is in operation, the drive means 11 is effecting movement of all of the conveyors, including the first conveyor 12, the second conveyor 14 and the intermediate conveyor 16. As a tray 46 moves on the first conveyor 12 and reaches its endmost position, it will engage the valve operator 210 effecting displacement of the piston valve 204, and thereby providing communication between the conduits 188 and 190. Thus, fluid is supplied to one end of the cylinder 150 and actuates the piston 154 and plunger 156 to pivot the lever arrangement, thereby causing displacement between the platform 112 and the frame of the first conveyor 12, as seen in Figures 2 and 3. It will therefore be seen that as the intermediate conveyor 16 moves upwardly, it will engage the underside of the tray 46 and since the intermediate conveyor is in operation, the tray will be laterally moved with respect to the first conveyor 12 and will be engaged on the second conveyor 14 for further disposition.

Of course, various mechanical modifications and substitutions may be made which will fall within the scope of my invention.

Having described the invention, what is claimed as new is:

1. In a conveyor system, a pair of first and second horizontal driven conveyors arranged in right angular relation, the first conveyor comprising a pair of driven side conveying members for supporting and moving an article, a driven cross conveyor disposed wholly between said members for transferring the article from the first to the second conveyor, supporting means for the cross conveyor operative to raise the same bodily above said members in a vertical path from a lowered position and maintaining said cross conveyor constantly level to lift the article off said members for transfer by the cross conveyor, means for operating said supporting means controlled by movement of the article by said members, means operatively connecting one of the pair of conveyors to the other for synchronized drive of the pair, and drive means for said one conveyor and the cross conveyor.

2. In a conveyor system according to claim 1, said supporting means comprising a vertically movable platform carrying said cross conveyor, guide means for said platform, and toggles operatively connected to said platform to raise the same.

References Cited in the file of this patent

UNITED STATES PATENTS

| Number | Name | Date |
| --- | --- | --- |
| 771,089 | Prescott | Sept. 27, 1904 |
| 1,132,840 | Garrett | Mar. 23, 1915 |
| 1,450,226 | Rebstock | Apr. 3, 1923 |
| 1,737,762 | Howe | Dec. 3, 1929 |
| 1,904,837 | Posey | Apr. 18, 1933 |
| 1,913,533 | Brunner | June 13, 1933 |
| 2,156,248 | Wegner | Apr. 25, 1939 |